United States Patent Office 3,446,809
Patented May 27, 1969

3,446,809
PROCESS FOR THE PREPARATION OF 2-AMINO-3-HYDROXYQUINOXALINES
Raymond C. Harris, Kingsport, Tenn., assignor to Eastman Kodak Company, Rochester, N.Y., a corporation of New Jersey
No Drawing. Filed Jan. 19, 1966, Ser. No. 521,512
Int. Cl. C07d 51/78
U.S. Cl. 260—250           8 Claims

ABSTRACT OF THE DISCLOSURE

A process for preparing 2-amino-3-hydroxyquinoxalines which comprises contacting certain 2,3-dihydroxyquinoxaline compounds with certain primary amines at a temperature of about 100° C. to about 250° C. and a pressure of about 500 p.s.i. to about 3500 p.s.i. The 2-amino-3-hydroxyquinoxaline compounds are useful as intermediates in the preparation, for example, of dyes and pigments.

---

This invention relates to a novel process for preparing a class of compounds useful in the synthesis of dyes, pigments and pharmaceuticals. In particular, the invention is directed to a novel process for preparing 2-amino-3-hydroxyquinoxaline compounds.

In the past, 2-amino-3-hydroxyquinoxaline has been prepared by two predominant methods. The first of such methods has been by the action of cyanogen gas on o-phenylenediamine. This method, however, has been found to be impractical and, accordingly, has not been favored in commercial synthesis. The second of such methods involves a rather complex three-step synthesis which involves treating 2,3-dihydroxyquinoxaline with phosphorus pentachloride, contacting the 2,3-dichloroquinoxaline thus obtained with ammonia to obtain 2,3-diaminoquinoxaline and hydrolyzing such compound to obtain the desired product, 2-amino-3-hydroxyquinoxaline. The reaction sequence for such process may be schematically represented as follows:

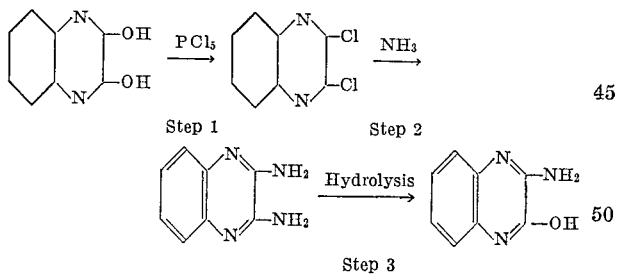

Step 1           Step 2

Step 3

The three-step synthesis outlined above is disadvantageous not only because of the length of time involved but, also, because the intermediates of steps 1 and 2 must be purified before a subsequent step can be initiated. More importantly, if it is desired to obtain an aminoquinoxaline wherein one of the hydrogen atoms in the amino group is replaced by a radical such as alkyl, alkoxyl, nitro and the like, the above procedure will not work. For example, 3-methylamino-2-hydroxy-quinoxaline must be prepared by initially producing 3-methylamino-2-chloroquinoxaline and then replacing the chlorine radical with a hydroxyl radical.

In accordance with the process of this invention, as will be more fully described hereinafter, it has been discovered that 2-amino-3-hydroxyquinoxaline compounds may be prepared in excellent yield and purity by a simple, economical one-step process.

Accordingly, it is an object of this invention to provide a simple and economical process for preparing 2-amino-3-hydroxyquinoxaline compounds and derivatives thereof.

A further object of the invention is to provide a process for preparing substituted and nonsubstituted 2-amino-3-hydroxyquinoxalines which eliminates the necessity of utilizing processes which require a multiple-step reaction sequence wherein the intermediate of each step must be purified.

The above objects, and other objects which will become apparent to those skilled in the art, are accomplished by the process of this invention which comprises, in general, reacting a substituted or nonsubstituted 2,3-dihydroxyquinoxaline with ammonia or a primary amine.

The compounds which are prepared by the process of this invention are represented by the formula

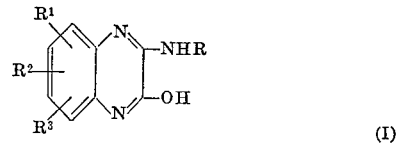

(I)

wherein
R represents hydrogen; alkyl, e.g. methyl, ethyl; substituted alkyl such as dialkylaminoalkyl, e.g. dimethylaminoethyl, hydroxyalkyl, alkoxyalkyl, e.g. methoxyalkyl, carboxyalkyl, e.g. carboxymethyl; aryl, i.e. a monocyclic carbocyclic aryl group, e.g. phenyl and substituted phenyl such as halophenyl; aralkyl, e.g. 2-phenylpropyl; alkaryl, e.g. tolyl; cycloalkyl, e.g. cyclohexyl; alkenyl, e.g. ethenyl and the like; and
$R^1$, $R^2$ and $R^3$ represent hydrogen; alkyl, e.g. methyl; substituted alkyl such as haloalkyl, e.g. trifluoromethyl; alkoxyl, e.g. methoxyl; nitro, halo, e.g. chloro, bromo; alkylsulfonyl, e.g. methylsulfonyl; sulfonamido, or combination thereof and the like, and $R^1$ and $R^2$ may further be joined to form an aryl or cycloalkyl radical.

In order to prepare the class of compounds illustrated above, by the method of this invention, a compound having the general formula

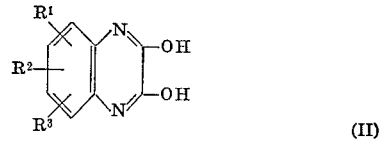

(II)

wherein $R^1$, $R^2$ and $R^3$ are defined in Formula I, above, is reacted with ammonia or an aliphatic or aromatic primary amine having the formula $$RNH_2 \qquad (III)$$

wherein
R represents a substituted or nonsubstituted aliphatic, cycloaliphatic or aromatic radical. Representatives primary aliphatic and cycloaliphatic amines include, for example, methylamine, propylamine, isopropylamine, n-butylamine, secbutylamine, t-butylamine, isobutylamine, amylamine, hexylamine, 3-dimethylamino-propylamine, cyclohexylamine, alkanolamines such as ethanolamine, 2-amino-1-butanol and the like. Representative primary aromatic amines include, for example, aniline and derivatives thereof such as chloroaniline and nitroaniline, benzylamine, β-phenylethylamine, toluidine, xylidine, benzedrine, sulfanilic acid and the like.

The mole proportions of reactants used in the process may vary from about 1 mole proportion of quinoxaline compound to from about 5 to about 100 mole proportions of ammonia or primary amine. The preferred range is a mole proportion (quinoxaline compound to ammonia or amine) of about 1:5 to about 1:50.

Temperatures for the reaction should be within the range of about 100° C. to about 250° C., with the preferred range being from about 150° C. to about 200° C.

It is noteworthy that the reaction proceeds at pressures of from about 500 p.s.i. or somewhat lower to about 3500 p.s.i. or higher, although preferably at from about 1000 to about 2800 p.s.i. and in the absence of catalysis or solvent. The reaction proceeds smoothly under such conditions and the product requires substantially no complex work-up procedures, previously necessary, to obtain the product with sufficient purity for commercial application.

The following examples will illustrate preferred modes of practicing the process of this invention.

Example 1

An amount 80 g. of 2,3,-dihydroxyquinoxaline, prepared from o-phenylenediamine and diethyl oxalate, was placed in an autoclave of 1 liter capacity. The autoclave was charged with 350 g. of ammonia, the temperature was raised to 150° C. and the reaction mixture was agitated at that temperature. After 5 hr. the autoclave was allowed to cool to room temperature, and the excess ammonia was bled off. A yield of 72 g. of 2-amino-3-hydroxyquinoxaline was obtained. The infrared curve was identical to that of a sample made from 2-amino-3-chloroquinoxaline and caustic. The product was pure enough for most uses. It may be further purified by dissolving it in warm dilute hydrochloric acid, filtering and reprecipitating with aqueous ammonia. 2-amino-3-hydroxyquinoxaline is soluble in dilute sodium hydroxide solutions and may be precipitated by neutralizing with acetic acid.

Example 2

An amount of 10 g. 2,3-diphydroxyquinoxaline, prepared as described in Example 1, and 45 g. of ammonia was heated to 200° C., in a rocking autoclave, and held at that temperature for 5 hr. 9.7 g. of product, identical to Example 1 were obtained.

Example 3

A rocking autoclave was charged with 10 g. of 2,3-dihydroxyquinoxaline and 80 g. of monomethyl amine and heated at 150° C. for 5 hr. The maximum pressure attained was 1000 p.s.i. A quantitative yield of product was obtained. This product was treated as described in Example 1, and was identical in all respects to a sample of 3-hydroxy-2-methylaminoquinoxaline prepared from 3-chloro-2-methaminoquinoxaline and sodium hydroxide.

Example 4

An amount of 5 g. of 2,3-dihydroxy-6-methoxyquinoxaline and 23 g. of ammonia was heated for 5 hr. at 175° C. in an autoclave. The maximum pressure attained was 2650 p.s.i. A quantitative yield of material, identical to that obtained by treatment of 2-amino-3-chloro-6-methoxyquinoxaline with caustic, was obtained.

Example 5

An amount of 3 g. of 2,3-dihydroxy-6-sulfonamidoquinoxaline and 15 g. of ammonia was heated at 175° C. for 5 hr. in a small rocking autoclave. The maximum pressure attained was 1430 p.s.i. The product was worked up as described in Example 1. Yield =71% of 2-amino-3-hydroxy-6-sulfonamidoquinoxaline.

*Analysis.*—Calcd. C, 39.99; H, 3.36; N, 23. 32; O, 19.98; S, 13.34. Found: C, 39.62; H, 3.9; N, 22.85; S, 12.9; O, 18.96.

Example 6

An amount of 10 g. of 2,3-dihydroxy-6-nitroquinoxaline and 80 g. of monomethylamine was heated in a rocking autoclave at 165° C. for 5 hr. The maximum pressure obtained was 1250 p.s.i. An excellent yield of 2-hydroxy-3-methylamino-6-nitroquinoxaline was obtained.

The examples listed in the following table further illustrate products obtained by reacting ammonia or a primary amine with the appropriate dihydroxyquinoxaline in accordance with the process of the invention.

TABLE

| Example No. | Amine | Product |
|---|---|---|
| 7 | Cyclohexylamine | Cl-quinoxaline-OH, -NH-C$_6$H$_{11}$ |
| 8 | Ethylamine | CF$_3$-quinoxaline-OH, -NHC$_2$H$_5$ |
| 9 | Methylamine | CH$_3$O$_2$S-quinoxaline-OH, -NHCH$_3$ |
| 10 | Aniline | CH$_3$O-quinoxaline-OH, -NH-C$_6$H$_5$ |
| 11 | Ammonia | CH$_3$-quinoxaline-OH, -NH$_2$ |

TABLE—Continued

| Example No. | Amine | Products |
|---|---|---|
| 12 | do | 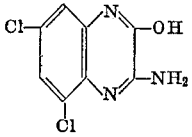 or 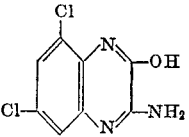 |
| 13 | 3-dimethylaminopropylamine | 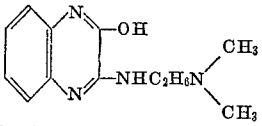 |

As stated hereinabove, the compounds produced by this process are useful as intermediates in the preparation of dyes, pigments and pharmaceuticals. An illustrative example of the preparation of a pigment utilizing one of the class of compounds herein prepared is given below.

Example 14.—Preparation of bis-quinoxalo-[2,3-b]-[2,3-e-]oxazine

Thirty-two parts of 2-amino-3-hydroxyquinoxaline, 40 parts of 2,3-dichloroquinoxaline and 32 parts of anhydrous sodium carbonate were heated at the boil in 400 parts of dimethylformamide for about one hour. The deposited yellow crystals were filtered off by suction, thoroughly washed with dimethylformamide and then with water and the suction filter cake, while still moist, was heated in dimethylformamide for an additional hour.

Bis-quinoxalo - [2,3-b] - [2,3-e] - oxazine was obtained in yields of above 80%. It is a bright yellow pigment with excellent fastness properties.

The invention has been described in considerable detail with particular reference to certain preferred embodiments thereof, but it will be understood that variations and modifications can be effected within the spirit and scope of the invention as described above and as defined in the appended claims.

I claim:

1. The process which comprises reacting a 2,3-dihydroxyquinoxaline of the formula:

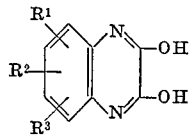

with the compound having the formula $RNH_2$ at a temperature of about 100° C. to about 250° C. and a pressure of about 500 p.s.i. to about 3500 p.s.i.; wherein the initial mole proportion of the 2,3-dihydroxyquinoxaline to the compound having the formula $RNH_2$ is from about 1 to 5 to about 1 to 100; and obtaining a compound of the formula:

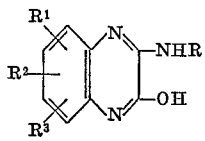

wherein R represents hydrogen, alkyl of up to 6 carbon atoms; alkyl of up to 6 carbon atoms substituted with hydroxy, lower alkoxy, carboxy, di-lower alkylamino or phenyl; phenyl; phenyl substituted with halogen, nitro or lower alkyl; cyclohexyl; or lower alkenyl; and $R^1$, $R^2$ and $R^3$ are the same or different and each represents hydrogen; lower alkyl, halolower alkyl; lower alkoxy, nitro, halo, lower alkylsulfonyl or sulfonamido.

2. The process according to claim 1 wherein the initial mole proportion of the 2,3-dihydroxyquinoxaline to the compound having the formula $RNH_2$ is from about 1 to 5 to about 1 to 50.

3. The process according to claim 2 wherein the reaction is conducted at a temperature of from about 150° C. to about 200° C. and at a pressure of from about 1000 p.s.i. to about 2800 p.s.i.

4. The process according to claim 3 wherein R is hydrogen, alkyl of up to about 6 carbon atoms, or phenyl and $R^1$, $R^2$, and $R^3$ are the same or different and each represents hydrogen, lower alkyl, lower haloalkyl, lower alkoxy, halo, or lower alkylsulfonyl.

5. The process according to claim 3 wherein R is hydrogen.

6. The process according to claim 3 wherein R is alkyl of up to about 6 carbon atoms.

7. The process according to claim 3 wherein R is phenyl.

8. The process which comprises reacting 2,3-dihydroxyquinoxaline with ammonia at a pressure of from about 1000 p.s.i. to about 2800 p.s.i. and at a temperature of from about 150° C. to about 200° C., wherein the initial mole proportion of the 2,3-dihydroxyquinoxaline to ammonia is from about 1 to 5 to about 1 to 100, and obtaining 2-amino-3-hydroxy-quinoxaline.

References Cited

UNITED STATES PATENTS 2,593,798   4/1952   Robinson et al.    260—288
3,178,434   4/1965   Pfister et al.    260—288

NICHOLAS S. RIZZO, *Primary Examiner.*